United States Patent [19]

Okazaki

[11] Patent Number: 4,481,096
[45] Date of Patent: Nov. 6, 1984

[54] POT-TYPED WATER PURIFIER WITH ELECTROLYZER

[76] Inventor: Tatsuo Okazaki, 7-18, Nishi- 2 chome, Kamifukuoka-shi, Saitama-ken, Japan

[21] Appl. No.: 565,056

[22] Filed: Dec. 23, 1983

[30] Foreign Application Priority Data

Dec. 28, 1982 [JP] Japan ............................ 57-229384

[51] Int. Cl.³ .................... C25B 9/00; C25B 15/08
[52] U.S. Cl. ................................ 204/265; 204/271; 204/278
[58] Field of Search ..................... 204/265, 271, 278

[56] References Cited

U.S. PATENT DOCUMENTS 3,623,969 11/1971 Hushihara ........................... 204/271
4,061,556 12/1977 Reis et al. .......................... 204/271
4,107,021 8/1978 Okazaki .............................. 204/263
4,119,520 10/1978 Paschakarnis et al. ............ 204/271
4,289,599 9/1981 Fushihara .......................... 204/271 X Primary Examiner—Donald R. Valentine
Attorney, Agent, or Firm—Frishauf, Holtz, Goodman and Woodward

[57] ABSTRACT

A pot-typed water purifier with an electrolyzer comprises a pot body having an opening at the top thereof, the pot body including an electrolyzing vessel divided into two chambers by a porous partition formed into a hollow shape, the chambers having therein negative and positive electrodes to form negative and positive chambers, respectively, a storage chamber airtightly separated from the electrolyzing vessel, means for supplying air pressure to the negative chamber and storage chamber alternatively so as to transport the water from the negative chamber to the storage chamber or to transport water from the storage chamber to a pouring nozzle, and a cover detachably covering said opening at the top of the pot body, said opening being adapted to supply water to the electrolyzing vessel.

3 Claims, 9 Drawing Figures

POT-TYPED WATER PURIFIER WITH ELECTROLYZER

BACKGROUND OF THE INVENTION

The present invention relates to a pot type water purifier with an electrolyzing function which includes an electrolyzing vessel divided into two chambers by a porous partition, the chambers having therein negative and positive electrodes respectively.

Generally, a water electrolyzing device needs to use a separate water pot in order to store ionized water after an electrolyzing operation, whereby the handling of the device from the start of the electrolyzing operation until the pouring out of the ionized water to a cup is very complicated and troublesome.

The present inventor had proposed a combination of a water pot and water electrolyzing device for use as a negative chamber and also as a storage tank or pot after electrolysis. In this prior device, there is a problem that there is apt to occur ion drift between negative and positive electrode chambers after electrolysis so that a balance condition may arise which is the same as the ionization in the original water before the electrolysis.

The present inventor had improved this device as described in U.S. Pat. No. 4,107,021 so as to maintain drinking water in a desired ionization state during storage with the aid of only a slight handling operation and to pour the drinking water with ease, for example into a general water pot. In this case, there is a new problem that after removing the water from the positive electrode chamber, there is apt to occur the drift of the drinking water from the negative electrode chamber to the positive electrode chamber through the porous partition during the storage time until the water levels of both chambers are equal to each other. Accordingly, the only drinking water in the pot that can be poured out is that remaining in the positive electrode chamber.

SUMMARY OF THE INVENTION

An object of this invention is to provide a pot-type water purifier with an electrolyzing function which is so improved as to enable transfer of drinking water in a desired ionization state from a negative electrode chamber to a storage chamber formed in the purifier with the aid of only a simple air pumping operation and to pour the drinking water with that same operation.

In the present invention, the pot type water purifier with an electrolyzing function includes a storage chamber airtightly separated from an electrolyzing area which is separated into negative and positive electrode chambers, two passages, one of which communicates from the bottom of the negative electrode chamber to the top of the storage chamber, and the other of which communicates from the bottom of the storage chamber to a pouring nozzle, and air pumping means switchably communicating with the negative electrode chamber and storage chamber.

In order to supply air pressure alternatively to either of the negative electrode chamber and storage chamber, the air pumping means including a manual changing means.

DETAILED DESCRIPTION

Figure 1:
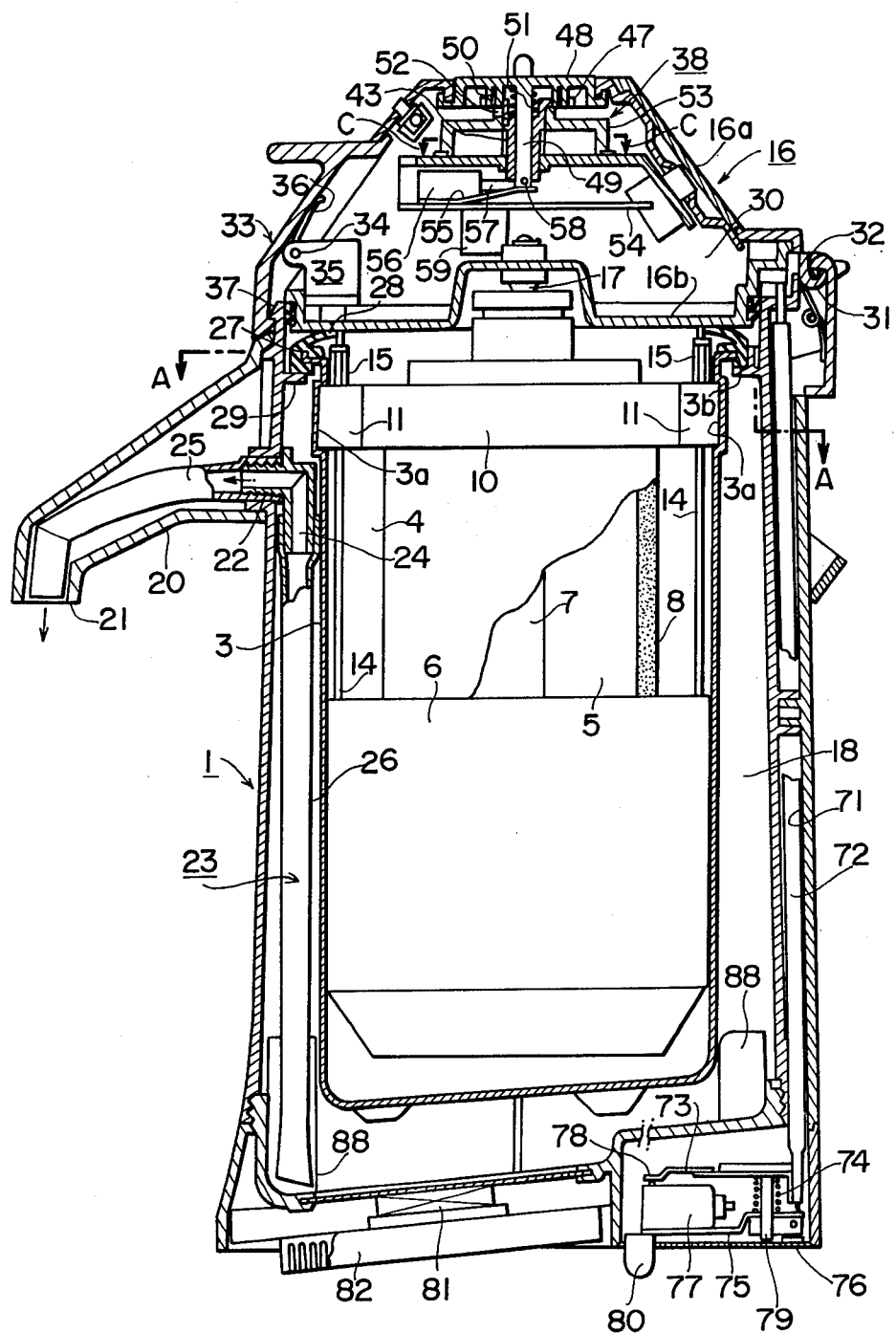
FIG. 1 is a vertical cross-section of a pot-type water purifier embodying the present invention.
Figure 2:
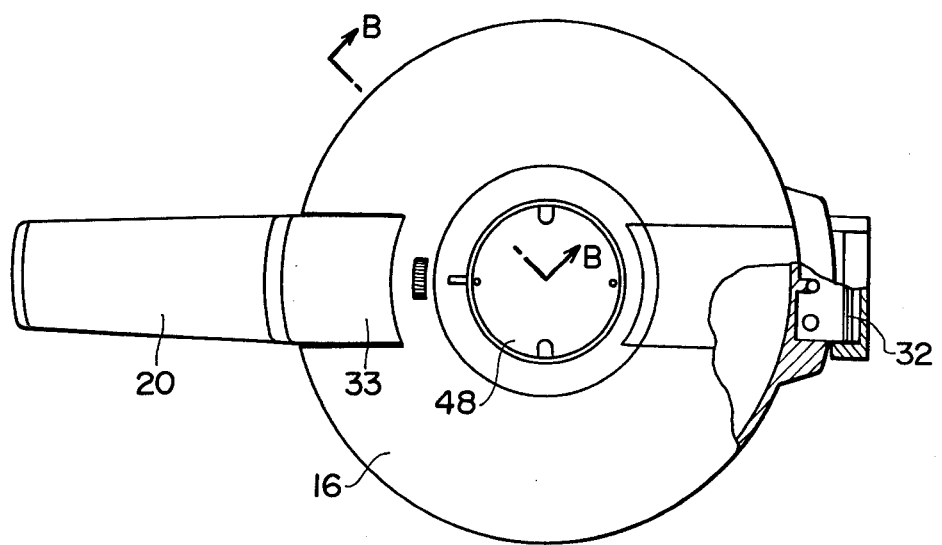
FIG. 2 is a plan view of the purifier.
Figure 3:
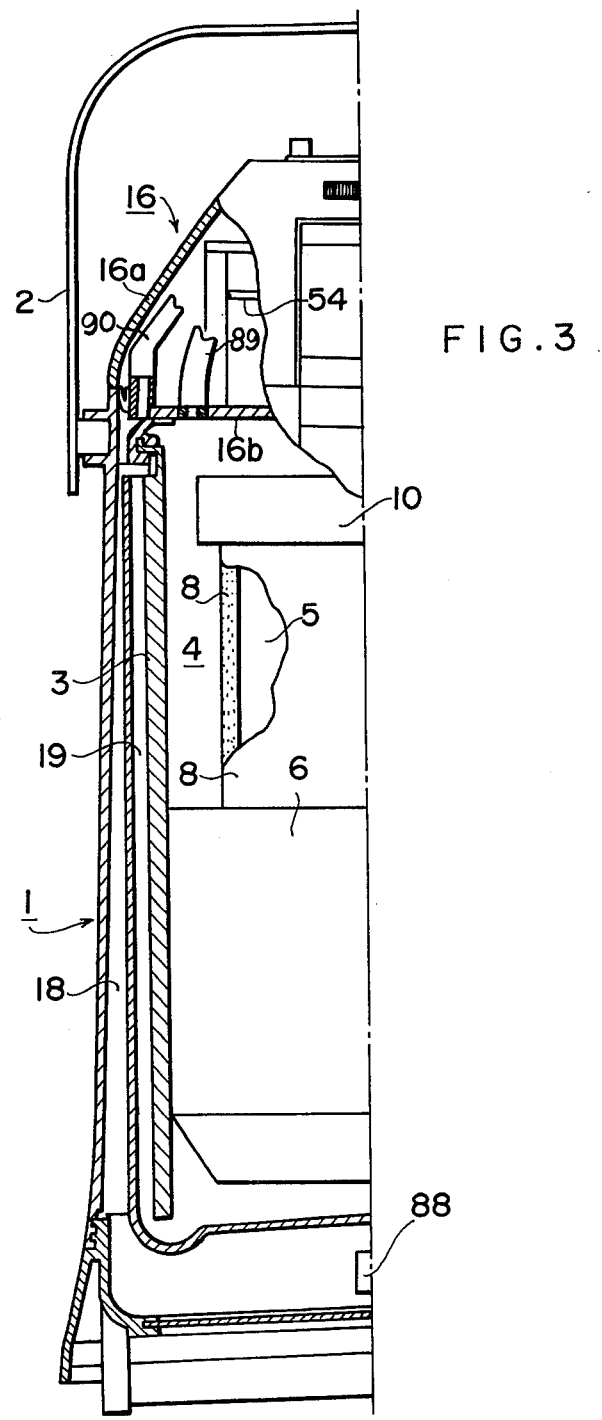
FIG. 3 is a vertical cross-section of the purifier taken along a line B—B of FIG. 2
Figure 4:
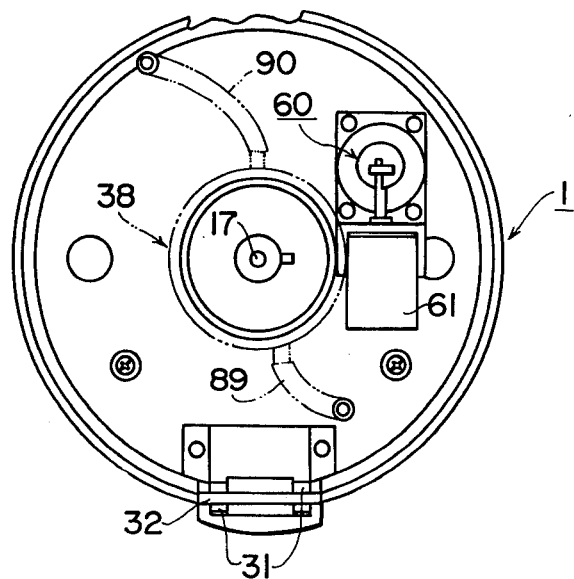
FIG. 4 is a horizontal cross-section of a cover disposed on a pot body, in which parts are illustrated.

Refering to the drawings, a pot-type water purifier embodying this invention comprises a pot body 1 made of hard plastic resin such as ABS resin and having a hanging handle 2 pivoted to both sides of the pot body. The pot body 1 includes an outer vessel, an electrolyzing vessel 3 detachably inserted in the outer vessel and divided into two chambers 4 and 5 having therein negative and positive electrodes 6 and 7 respectively, by a porous partition 8 formed into a hollow shape, so that the negative electrode chamber 4 is situated outside of the partition 8 and the positive electrode chamber 5 is situated inside of the partition 8. Said porous partition may be made of unglazed pottery material, or other material available to use for an electrolyzing operation. Said negative electrode 6 may be made of stainless steel and said positive electrode of carbon black or ferrite. In the illustrated embodiment, the negative electrode is a plate curved along the inner wall of the vessel 3, and the positive electrode 7 is a pole or rod-shaped element.

The partition 8 can be inserted into the vessel 3 through a large diameter opening formed in the top thereof in a manner so as to be detachably set on the bottom of the vessel 3 in a waterproof manner by suitable means, which is, for example, adapted to have a bottom (not shown). To the top of the partition 8 is detachably attached a holding member 10 having a plurality of engaging protrusions 11 formed at the outer periphery thereof. The protrusions 11 are inserted into engaging portions 3a, which are formed in the inner periphery of the vertical wall of the vessel 3 as corresponding to the protrusions 11, with a rotating operation, slidably.

Figure 5:
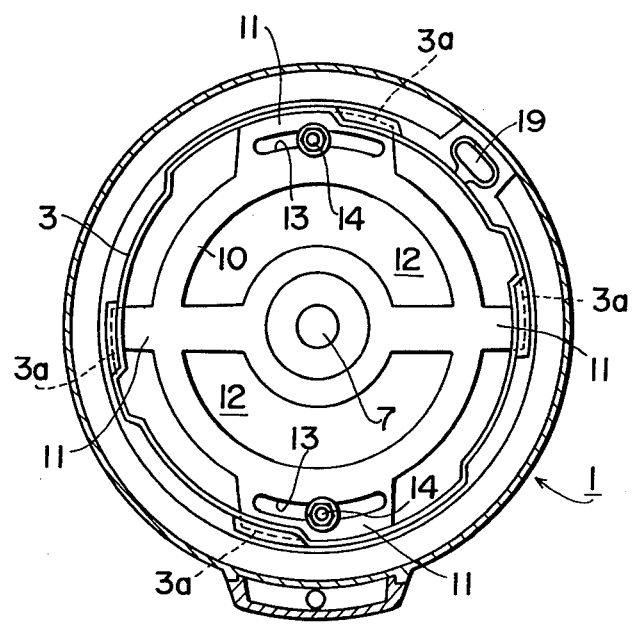
FIG. 5 is a horizontal cross-section of the pot body taken along a line A—A of FIG. 1.

Said holding member 10 is adapted to hang the positive electrode 7 in the chamber 5. Said holding member 10 may be made of a plastic plate which has two through bores 12 (FIG. 5) therein for passing the water and two guide slits 13 through which upwardly penetrate two rods 14 which extend upwardly from the negative electrode 6. Each of the rods 14 has a screw threaded portion at its top, so that a nut 15 may be detachably screwed thereto to fix the negative electrode 6 to the partition 8 such that the negative electrode protectably surrounds the partition 8. At least one of the rods 14 is used to lead direct current to the negative electrode 6 from an A/D converter (not shown) disposed in a cover 16 which is detachably set on the top of the pot body 1 in order to close the opening of the outer vessel. The top of the positive electrode 7 electrically communicates with a lead terminal member 17, positioned at the center portion of the bottom of the cover 16 and communicating with the A/D converter.

Between the vertical walls of the vessel 3 and outer vessel is formed an annular shaped storage chamber 18. Said storage chamber 18 communicates with the negative electrode chamber 4 by a passage 19 formed in the vertical wall of the vessel 3 so as to pass water from the bottom of the negative electrode chamber 4 to the top of the storage chamber 18.

The pot body 1 further includes a nose-shaped nozzle 20 fixedly attached to the front side thereof, the nozzle 20 having an opening 21 for pouring under the front end thereof, and a hole 22 formed at the front side thereof in a position corresponding to the nozzle 20. The nozzle is provided with a passage 23 communicating with the opening 21 at its one end and the bottom of the storage chamber 18 at its other end.

The passage 23 comprises an L-shaped pipe joint 24 fixedly inserted into the hole 22 in the interior of the outer vessel, a flexible tube 25 disposed in the nozzle 20 and connected to the joint 24 so as to communicate with the opening 21, and a vertical pipe 26 disposed in the outer vessel and connected to the joint 24 so as to communicate with the bottom of the storage chamber 18.

The vessel 3 includes an outer flange 36 formed at the top end thereof, and an annular packing rubber member 27 with a fin 28 attached to the flange 36. The outer vessel includes an opening at its top end, and an internal flange 29 on which the flange 36 is detachably set via the packing member 27. The fin 28 of the packing member 27 is available to maintain airtightness between the interior of the vessel 3 and the storage chamber 18 when the cover 16 is detachably set on the pot body 1 so as to close the upper end of the vessel 3 and the outer vessel.

The cover 16 includes a control chamber 30 formed by means of a cup-shaped outer shell 16a and a bottom plate 16b the chamber 30, a U-shaped hook 31 detachably engaged with a hook pin 32 mounted on the rear end of the top of the pot body 1, and a lock member 33 which is pivoted to a pivot pin 34 coupled to a pedestal 35 mounted on the bottom plate 16b and which is biased by means of a torsional spring member 36 in a counter-clockwise direction in FIG. 1, so as to be engageable with a hook 37 formed at the front end of the top of the pot body 1, thereby to cause the bottom plate 16b to touch the fin 28 in airtightness with the cover 16 closing the top of the pot body 1.

In the chamber 30 is disposed a valve 38 which includes a valve chamber 39 with its circular periphery having an inlet port 40 and two outlet ports 41 and 42, a manual operating shaft 43 formed into a pipe-shaped rod vertically mounted at the central position of the valve chamber 39, and a rubber roller 44 (FIG. 6) juxtaposed to the shaft 43 by means of a pair of gears 45 and 46 integrally formed to the shaft 43 and partially around the roller 44 respectively so as to be turnable along the circular periphery of the valve chamber 39 in planetary revolution mode. As shown in FIG. 1, the shaft 43 has teeth 47 on the top flange thereof.

To the top of the cover 16 is turnably disposed a manual operating knob 48, the knob 48 having a vertical shaft 49 slidably penetrating the center of the shaft 43 and teeth 50 engaged with the teeth 47 in a rotating direction and slidable in a vertical direction. Between the knob 48 and the top of the shaft 43 is baised a compression spring member 51 in a manner to surround the shaft 49, whereby the lower ends of the teeth 50 are in contact with a plane cam 52 integrally formed at the upper portion of an enclosure 53 which is used for enclosing the valve chamber 39.

In the chamber 30 is further disposed a base plate 54 on which is mounted a leaf spring 55 so as to bias the shaft 48 upwards by spring power, and a microswitch means 56 having a switching leaf 57, said switching leaf 57 being pushable by a cross pin 58 attached to the lower end of the shaft 49, when the shaft 49 is rotated to a prescribed position of rotation. The leaf 55 is, when the shaft 49 is pushed down, concurrently used to operate a switching device 59 which is attached to the lower side of the base plate 54.

In the chamber 30 is further disposed an air pump means 60 which includes, in this embodiment, an electric motor 61 having a rotor shaft 62, a rubber bag 63 attached to a pump body 64 as to form a flexible pump chamber 65, an inlet check valve 66 and an outlet check valve 67 coupled to the pump body 64 so as to pass the inlet port 68 through the pump chamber 65 and the latter through the outlet port 69 respectively, and a pumping member 70 eccentrically coupled to the rotor shaft 62 and mounted on the top of the rubber bag 63 so as to cause the rubber bag 63 to draw a breath thereby to supply air from the inlet port 68 to the outlet port 69 in a compression state.

The inlet port 68 is passed through the atmosphere and the outlet port 69 is passed through the interior of the vessel 3. To the rear side portion of the pot body 1 is formed a vertical guide hole 71 into which is slidably inserted a switching rod 72 having a top end penetrating the upper circular edge of the pot body so as to face to the lower circular edge of the cover 16, and a lower end attached to a switching lever 73.

The switching lever 73 is biased upwards by means of a compression spring member 74 coupled to a lever 75 pivotally mounted on a bottom plate 76 attached to the lower portion of the pot body 1, so as to operate a micro-switch means 77 with a button 78 mounted on the lever 75 until a stopper pin 79 attached to the switch lever 73 is in contact with the bottom plate 76, as the switch lever 73 pushes down the button 78 in a reverse direction against the spring bias. The lever 75 has a piece 80 protruded downwards through a bore formed in the bottom plate 76.

To the bottom area of the pot body 1 is disposed means 81 for heating and/or cooling water. This means 81 may be a Peltier effect element with heat exchanging fins 82, or any other prior device such as a small typed refrigerator electrically driven. An electrical communication between the pot body 1 and cover 16 without the electrodes is accomplished by means of inserting hole 83 formed at the upper annular edge of the pot body 1, a lead element 84 slidably disposed in the hole 83 and communicating with the microswitch means 77, Peltier effect element 81, etc., said lead element 84 having a flange 85 biased by means of a compression spring member 86 upwards, and a contact rod 87 fixed to the lower annular edge of the cover 16 so as to fit into the hole 83 and contact with the top of the lead element 84 when the cover 16 is set on the pot body 1.

In this embodiment, a member indicated by a reference number 88 is a pedestal for supporting the vessel 3 on the bottom of the interior of the outer vessel. The outlet port 41 communicates via a tube 89 with the top of the vessel 3 and the outlet port 42 via a tube 90 with the top of the storage chamber 18. In operation, the lock member 33 is disengaged from the hook 37 so as to turn the cover 16 around the hook pin 32 thereby to remove the cover 16 on the pot body 1 and disclose the openings of the vessels.

After pouring the water through the opening of the vessel 3 so as to fill both electrode chambers 4 and 5, the cover 16 is set on the pot body 1 with the lock member 33 engaged with the hook 37, whereby the contact rod 87 is in contact with the top of the lead element 84 so as to be electrically communicated, and the switching rod 72 is pushed downwards against the spring bias by the lower circular edge of the cover 16 thereby to cause switch lever 73 to push the button 78 and switch on the micro-switch means 77. Then the knob 48 is rotatingly controlled to set it to an electrolyzing position.

Figure 6:
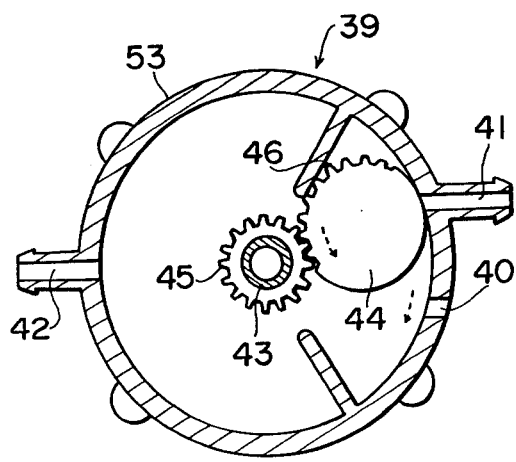
FIG. 6 is a horizontal cross-section of the cover taken along a line C—C of FIG. 1.
Figure 8:
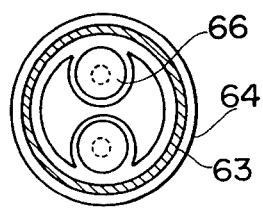
FIG. 8 is a horizontal cross-section of the air pump.
Figure 7:
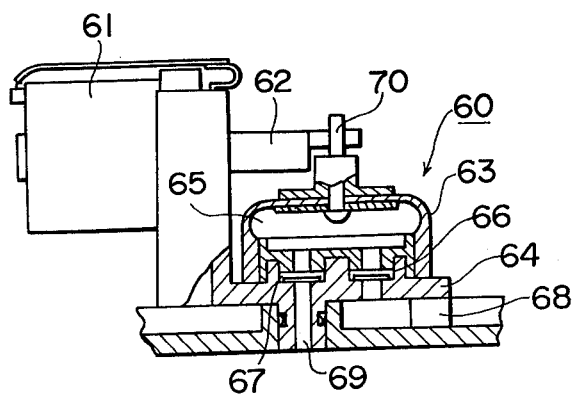
FIG. 7 is a vertical cross-section of an air pump disposed in the cover.
Figure 9:
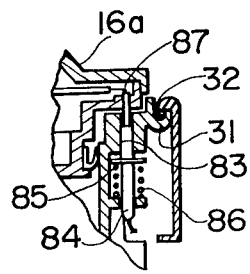
FIG. 9 is a vertical cross-section of electric communicating parts between the cover and pot body.

In this setting position, the lower end of the teeth 47 is prevented by the cam 52 from moving downwards, the rubber roller 44 is turned to a position shown in FIG. 6 so as to close the outlet port 41, and the switch leaf 57 is pushed by the cross pin 58 thereby to cause the electrolysis to be started, and set on a timer (not shown).

After a prescribed time, the electrolysis is completed and the demand signal generated from the timer causes the motor 61 to be driven so as to operate the pump means 60 thereby to supply compression air to the vessel 3. Since the vessel 3 is in airtightness due to the outlet port 41 being closed and the storage chamber 18 is not in airtightness due to the outlet port 42 being open to the atomosphere via the inlet port 43, the water in the negative electrode chamber 4 is transfered through the passage 19 to the storage chamber 18 by the compression air power. by the next demand signal generated from the timer after complete transfer of the water, the motor 61 is stopped and the Peltier effect element 81 is energized so as to cool or warm the water in the storage chamber 18. Then the timer is reset. In order to pour the water outside through the passage 23 from the storage chamber 18, the knob 48 is rotatingly controlled to set it to a pouring position, whereby the lower end of the teeth 47 are no longer prevented from moving down by the cam 52 so that the knob 48 is movable downwards, the rubber roller 44 is turned to a position where the roller 44 close the inlet port 43, and the switch leaf 57 releases from the cross pin 58 thereby to cause the microswitch means 56 to switch off.

When the knob 48 is pushed down by manual operation, the leaf spring 55 is pushed by the lower end of the shaft 49 so that the switching device 59 is changed to a switch-on condition, thereby to drive the motor 61 via a route separated from the micro-switch means 56 and timer. Then the air pump means 60 is driven to carry the water from the storage chamber 18 to the pouring opening of the nozzle 20 via the passage 23, because the vessel 3 and storage chamber 18 are in airtightness due to the inlet port 43 being closed.

In this case, even if the water remains in the negative electrode chamber 4, the air pressure whereby supplied to both chambers 4 and 18 is equal, only the pouring operation to the nozzle 20 occurs.

When the manual pushing force is released from knob 48, the knob 48 is moved upwards by the spring bias of the spring members 51 and 55, so that the switching device 59 is changed to a switch-off condition, thereby to stop the motor 61.

In a case where the electrolysis device is operating the pot falls, the piece 80 is pushed downwards through the bore of the bottom plate 76 by the bias of the spring member 74 so as to switch off the micro-switch means 77 thereby to stop the electric current to all the electrical control system which controls the electrolysis. Also, when the cover is removed from the pot body 1, the switching rod 72 is pushed upwards by the bias of the spring member 74 and then the micro-switch means 77 is off.

Further, the storage chamber and vessel including negative and positive electrode chambers may be arranged side by side.

In order to supply compression air alternatively to the negative electrode chamber and the storage chamber, though this embodiment includes a specific construction as the valve 38 so as to supply compression air alternatively to the vessel 3 and both of the vessel 3 and storage chamber 18, the assembly may include a changing air valve to supply air alternately to the vessel 3 and storage chamber 18, and a check valve disposed in the route of the passage 19 in order to prevent air from flowing from the storage chamber 18 to the negative electrode chamber 4.

What is claimed is:

1. A pot-type water purifier with an electrolyzing function comprising:
   a pot body having an opening at the top thereof,
   a pouring nozzle,
   the pot body including therein an electrolyzing vessel,
   a porous partition dividing the electrolyzing vessel into two chambers,
   negative and positive electrodes in said respective chambers to form negative and positive electrode chambers respectively,
   a storage chamber airtightly separated from said electrolyzing vessel,
   means for liquid communicating said storage chamber with said negative electrode chamber and with said pouring nozzle,
   means for alternatively supplying air pressure to said negative electrode chamber and storage chamber to transport water from said negative electrode chamber to said storage chamber or to transport water from said storage chamber to said pouring nozzle, respectively, and
   a cover detachably disposed on said pot body to close said opening at the top of said pot body, said opening, when open, being adapted to enable supplying water from said opening to said electrolyzing vessel.

2. The pot-type water purifier of claim 1, wherein said liquid communicating means comprises two passages, one of which communicates between the bottom of said negative electrode chamber and the top of said storage chamber, and the other of which communicates between the bottom of said storage chamber and the opening of said pouring nozzle.

3. The pot-type water purifier of claim 2, wherein said air pressure supplying means comprises a valve for supplying compressed air alternatively to said electrolyzing vessel alone and to both said electrolyzing vessel and said storage chamber.

* * * * *